United States Patent [19]

Nomaru et al.

[11] Patent Number: 5,168,453

[45] Date of Patent: Dec. 1, 1992

[54] WORK POSITIONING METHOD AND APPARATUS

[75] Inventors: Minoru Nomaru, Yokohama; Tatsuo Naitoh, Atsugi, both of Japan

[73] Assignee: Nissan Motor Co., Ltd., Yokohama, Japan

[21] Appl. No.: 505,330

[22] Filed: Apr. 5, 1990

[30] Foreign Application Priority Data

Apr. 27, 1989 [JP] Japan .................................. 1-105801

[51] Int. Cl.⁵ ........................ G06F 15/46; B23P 21/00
[52] U.S. Cl. ..................... 364/468; 29/407; 29/430; 29/712; 364/559; 395/88; 395/904; 901/46
[58] Field of Search ............. 364/468, 474.22–474.27, 364/512, 559, 188–193; 395/904, 912, 919, 88, 89, 80; 29/702, 712, 720, 407, 430, 783, 787, 791; 901/6, 45–47

[56] References Cited

U.S. PATENT DOCUMENTS

| | | | |
|---|---|---|---|
| 4,359,675 | 11/1982 | Miller, III | 318/603 |
| 4,589,184 | 5/1986 | Asano et al. | 29/712 X |
| 4,691,905 | 8/1987 | Tamura et al. | 269/45 |
| 4,707,647 | 11/1987 | Coldren et al. | 318/568 |
| 4,738,022 | 4/1988 | Sakamoto et al. | 29/711 X |
| 4,774,757 | 10/1988 | Sakamoto et al. | 29/702 |
| 4,796,200 | 1/1989 | Pryor | 364/559 X |
| 4,945,488 | 7/1990 | Carver et al. | 364/468 X |
| 5,005,277 | 4/1991 | Uemura et al. | 29/712 X |
| 5,010,634 | 4/1991 | Uemura et al. | 29/712 X |

FOREIGN PATENT DOCUMENTS

| | | |
|---|---|---|
| 0062335 | 10/1982 | European Pat. Off. . |
| 0106415 | 4/1984 | European Pat. Off. . |
| 0147066 | 7/1985 | European Pat. Off. . |
| 59-144595 | 8/1984 | Japan . |
| 2051411 | 1/1981 | United Kingdom . |
| 2128772 | 5/1984 | United Kingdom . |
| 2169422 | 7/1986 | United Kingdom . |
| 2224865 | 5/1990 | United Kingdom . |

Primary Examiner—Joseph Ruggiero
Attorney, Agent, or Firm—Pennie & Edmonds

[57] ABSTRACT

A method and apparatus for positioning a plurality of works combined to assemble an article. Values of positions of a plurality of reference points set on each of the works are measured. The measured position values are accumulated to provide measured position data defining a measured position of the work. The measured position data are compared with design data defining a position specified for the work to provide error data defining a difference between the measured and specified positions for the work. The error data are used to position the work with respect to the other works.

10 Claims, 5 Drawing Sheets

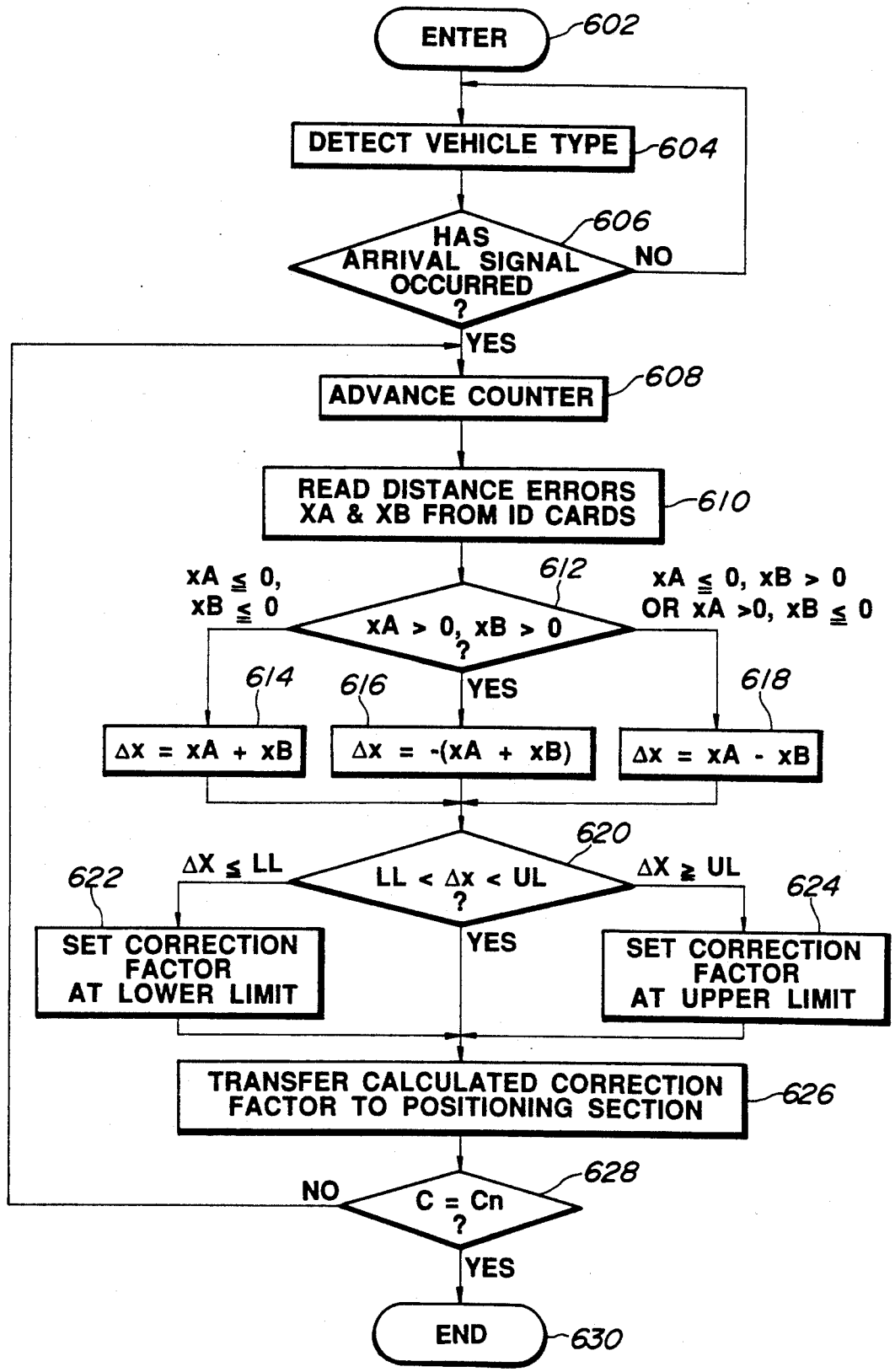

WORK POSITIONING METHOD AND APPARATUS

BACKGROUND OF THE INVENTION

This invention relates to a method and apparatus for positioning a plurality of works combined to assemble an article such as an automotive vehicle body.

For example, an automotive vehicle body is assembled by combining various kinds of works including a floor main, left- and right-body sides, a roof, etc. In order to assemble an automotive vehicle body without distortions, each of these works should be positioned with respect to the other works within closed tolerances. However, the required range of work positioning accuracy cannot be attained by the current practice where work positioning controls have been made on an assumption that the same kind of works have the same dimensions.

SUMMARY OF THE INVENTION

Therefore, it is a main object of the invention to provide a work positioning method and apparatus which can increase the work positioning accuracy to a remarkable extent.

There is provided, in accordance with the invention, an apparatus for positioning a plurality of works combined to assemble an article. The apparatus comprises first means for measuring values of positions of a plurality of reference points set on each of the works, second means for accumulating the measured position values to provide measured position data defining a measured position of each the work, third means for providing design data defining a position specified for each the work, fourth means for comparing the measured position data with the design data to provide error data defining a difference between the measured and specified positions for each the work, and fifth means for positioning each the work based on the error data provided therefor.

In another aspect of the invention, there is provided an apparatus for positioning a plurality of works combined to assemble an automotive vehicle body. The apparatus comprises first means for measuring values of distances of a plurality of reference points set on each of the works from respective predetermined positions, second means for accumulating the measured distance values to provide measured distance data defining the measured distance values in relation to the respective reference points, third means for providing design data defining distance values specified for the respective reference points, fourth means for comparing the measured distance data with the design data to provide error data defining a difference between the measured and specified distance values for each of the reference points, and fifth means for positioning each the work based on the error data provided therefor.

In another aspect of the invention, there is provided a method of positioning a plurality of works combined to assemble an article. The method comprises the steps of measuring values of positions of a plurality of reference points set on each of the works, accumulating the measured position values to provide measured position data defining a measured position of each the work, providing design data defining a position specified for each the work, comparing the measured position data with the design data to provide error data defining a difference between the measured and specified positions for each the work, and positioning each the work based on the error data provided therefor.

In still another aspect of the invention, there is provided a method of positioning a plurality of works combined to assemble an article. The method comprises the steps of measuring values of distances of a plurality of reference points set on each of the work from respective predetermined positions, accumulating the measured distance values to provide measured distance data defining the measured distance values in relation to the respective reference points, providing design data defining distance values specified for the respective reference points, comparing the measured distance data with the design data to provide error data defining a difference between the measured and specified distance values for each of the reference points, and positioning each the work based on the error data provided therefor.

BRIEF DESCRIPTION OF THE DRAWINGS

This invention will be described in greater detail by reference to the following description taken in connection with the accompanying drawings, wherein like numerals refer to like parts in the several views and in which:

FIG. 5 is a flow diagram showing the programming of the digital computer used in the control section of FIG. 2.

DETAILED DESCRIPTION OF THE INVENTION

Figure 1:
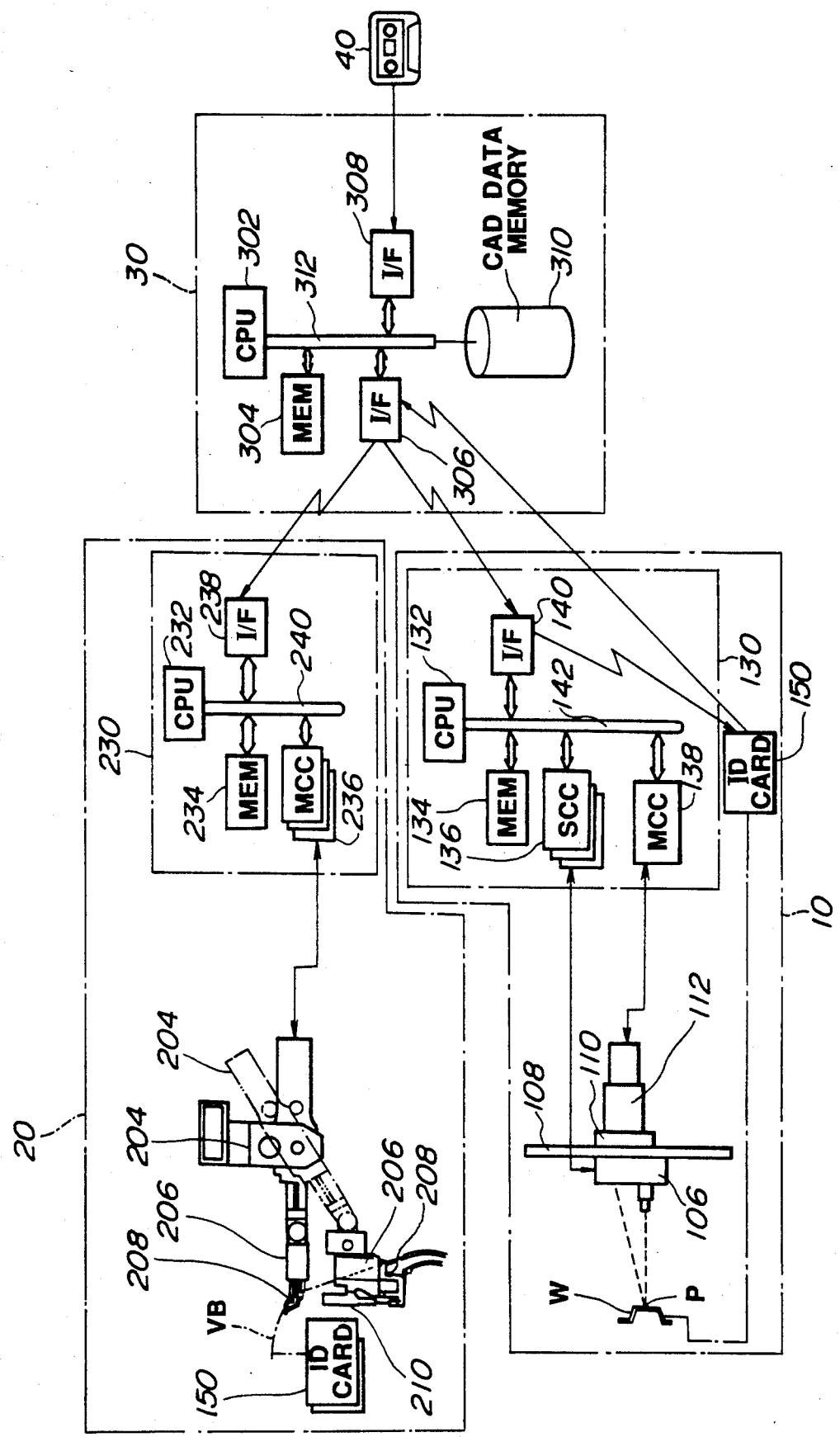
FIG. 1 is a schematic block diagrams showing one embodiment of a work positioning apparatus made in accordance with the invention.

With reference to the drawings, where like numerals refer to like parts in the several views, and in particular to FIG. 1, there is shown a schematic block diagram of a work positioning apparatus embodying the method and apparatus of the invention. Although the invention will be described in connection with an automobile assembling line, it will be understood that the invention is not limited in any way to this application. The work positioning apparatus includes a measuring section 10, a positioning section 20 and a control section 30. The control section 30 controls the measuring and positioning sections 10 and 20.

The measuring section 10 measures values of distances of respective reference points set on each of a plurality of works combined to assemble an automotive vehicle body. The measured distance values are accumulated to provide measured distance data defining the measured distance values in relation to the respective reference points. The measuring section 10 has design data transferred thereto from the control section 10. The design data, which define distance values specified for the respective reference points set on each of the works, are obtained when the vehicle body is designed. The measured distance data are compared with the design data to provide error data defining a difference between the measured and specified values for each of the reference points. The error data are transferred to an identification (ID) card 150 provided for each of the works. Similar operations are made for all of the works.

The error data are transferred from the ID cards 150 to the control section 30 which includes an expert system. The control section 30 utilizes the error data to calculate values for desired work positions. Control words specifying the desired work positions are transferred from the control section 30 to the positioning section 20 which thereby positions the works according to the calculated values for them.

Figure 2:
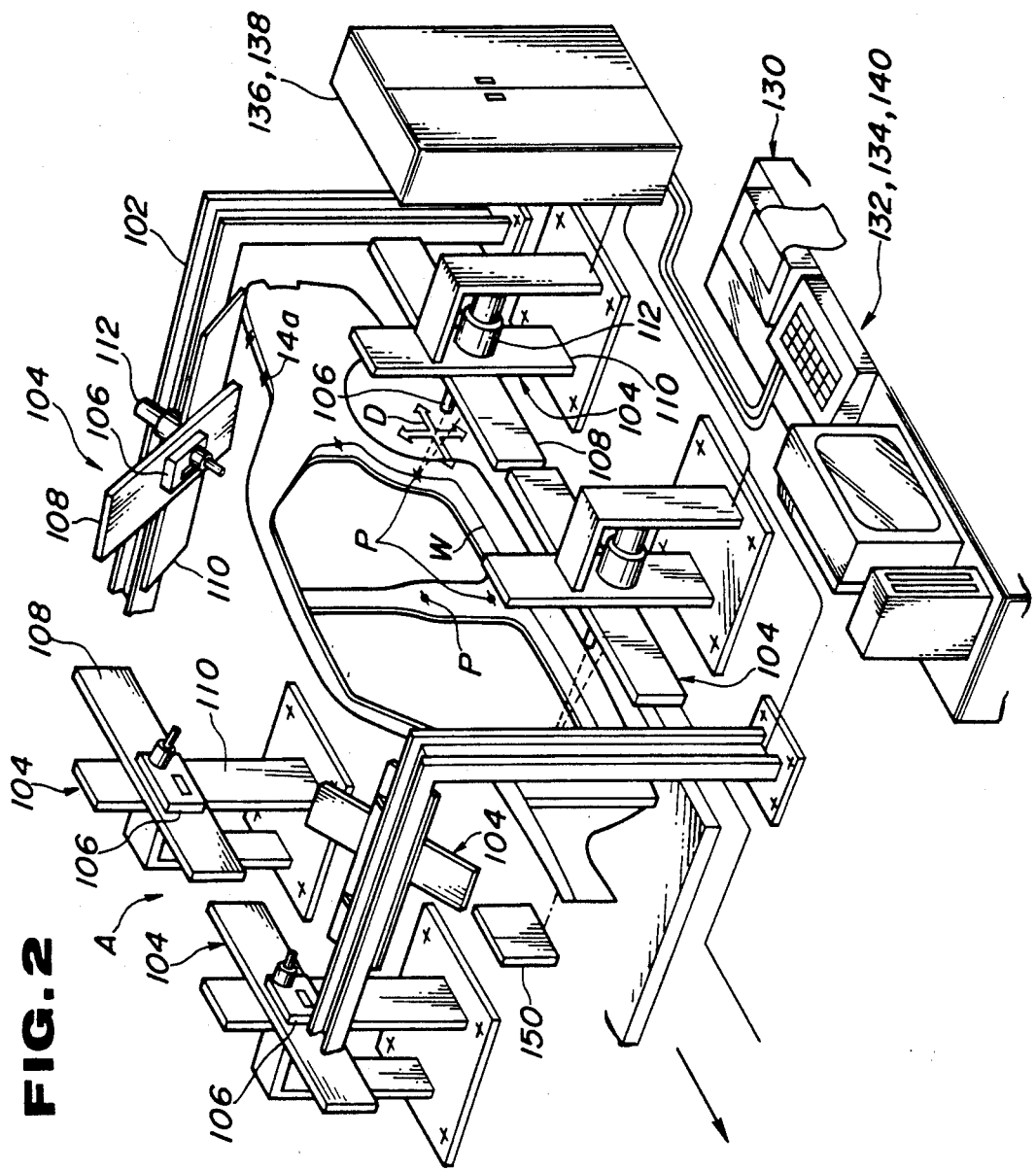
FIG. 2 is a perspective view showing a measuring section used in the work positioning apparatus of FIG. 1.

Referring to FIG. 2, the measuring section 10 is provided in a measuring station A forming an automotive vehicle body assembling line. The measuring station A is shown as having a work W (in the illustrated case a vehicle body side panel) transferred thereinto. The measuring station A includes a support frame 102 having a plurality of (in the illustrated case six) distance measuring units 104 secured thereon. Each of the distance measuring units 104 includes a distance sensor 106 of the type having a laser beam generator adapted to a laser beam toward the work and a photo sensor having light sensitive elements arranged in a line for receiving the laser beam reflected from the work. The distance sensor 106 is connected in a circuit capable of producing a signal indicative of the distance of the work with respect to the distance sensor 106. This distance indication signal is dependent upon the position of the light sensitive element(s) which receives the the reflected laser beam. The distance sensor 106 is carried on a carrier 108 adapted to move with respect to a slider 110. The direction of movement of the carrier 108 is perpendicular to the direction of the optical axis of the laser beam generator. The slider 110 is adapted to move with respect to the support frame 102. The direction of movement of the slider 110 is perpendicular to the direction of the optical axis of the laser beam generator and the direction of movement of the carrier 108. The distance measuring unit 104 also includes a servo motor 112 for moving the carrier 108 and the slider 110 to move the distance sensor 106 in directions perpendicular to the direction of the optical axis of the laser beam generator, as indicated by the bold arrows D of FIG. 2. The distance sensor 106 and the servo motor 112 are connected to a control unit 130. The control unit 130 controls the servo motor 112 to move the distance sensor 106 in such a manner as to direct the laser beam generated from the laser beam generator to a reference point P positioned on the work W. It is to be noted, of course, that the reference point is not required to be marked actually on the work. The control unit 130 may include a memory section having reference point position data stored therein, the position data defining reference point positions in relation to the respective reference points P. In this case, the control unit 130 produces a command based on the reference point position data to cause the step motor 112 to bring the distance sensor 106 to an appropriate positions where the laser beam is directed to the reference point P. The control unit 130 receives the distance indication signal and stores the measured value of the distance of the reference point P from the distance sensor 106 in relation to the reference point P. The control unit 130 repeats similar operations for the other reference points P to form measured distance data including the measured values of the distances of the respective reference points from the corresponding distance sensors. It is to be noted, of course, that the control unit 103 may be arranged to produce commands based on the reference point position data to cause all of the step motors to bring the respective distance sensors simultaneously to appropriate positions where the laser beams are directed to the respective reference points P when the measured distance data are formed.

Returning to FIG. 1, the control unit 130 employs a digital computer including a central processing unit (CPU) 132, a memory (MEM) 134, sensor control circuits (SCC) 136, motor control circuits (MCC) 138, and an interface (I/F) 140. The central processing unit 132 communicates with the rest of the computer via data bus 142. The memory 134 contains the program for operating the central processing unit 132. The memory 134 has a memory section for storing reference point position data used in controlling the positions of the distance sensors 106 and another memory section into which selected one of a plurality of sets of vehicle body design data provided for different vehicle types is transferred through the interface 140 from the control section 30. Each set of the design data includes specified distance data for the corresponding one of the works with which a vehicle body is to be assembled. The specified distance data define specified distance values of the respective reference points from the corresponding distance sensors 106 in relation to the respective reference points. The sensor control circuits 136 control the respective distance sensors 106 and receive distance indication signals from the respective distance sensors 106. The measured distance data including the measured distance values in relation to the respective reference points are stored in the memory 134.

Control words specifying desired distance sensor positions are periodically transferred by the central processing unit 132 to the motor control circuits 138. The motor control circuits 138 convert the received control words into pulse signals for application to the respective servo motors 112. The central processing unit 132 also calculates an error between the measured and specified distance values for each of the reference points P to form distance error data. The interface 140 receives various command signals from the control section 30 and transfers the distance error data to the corresponding one of the identification (ID) cards 150 provided for the respective works.

Figure 3:
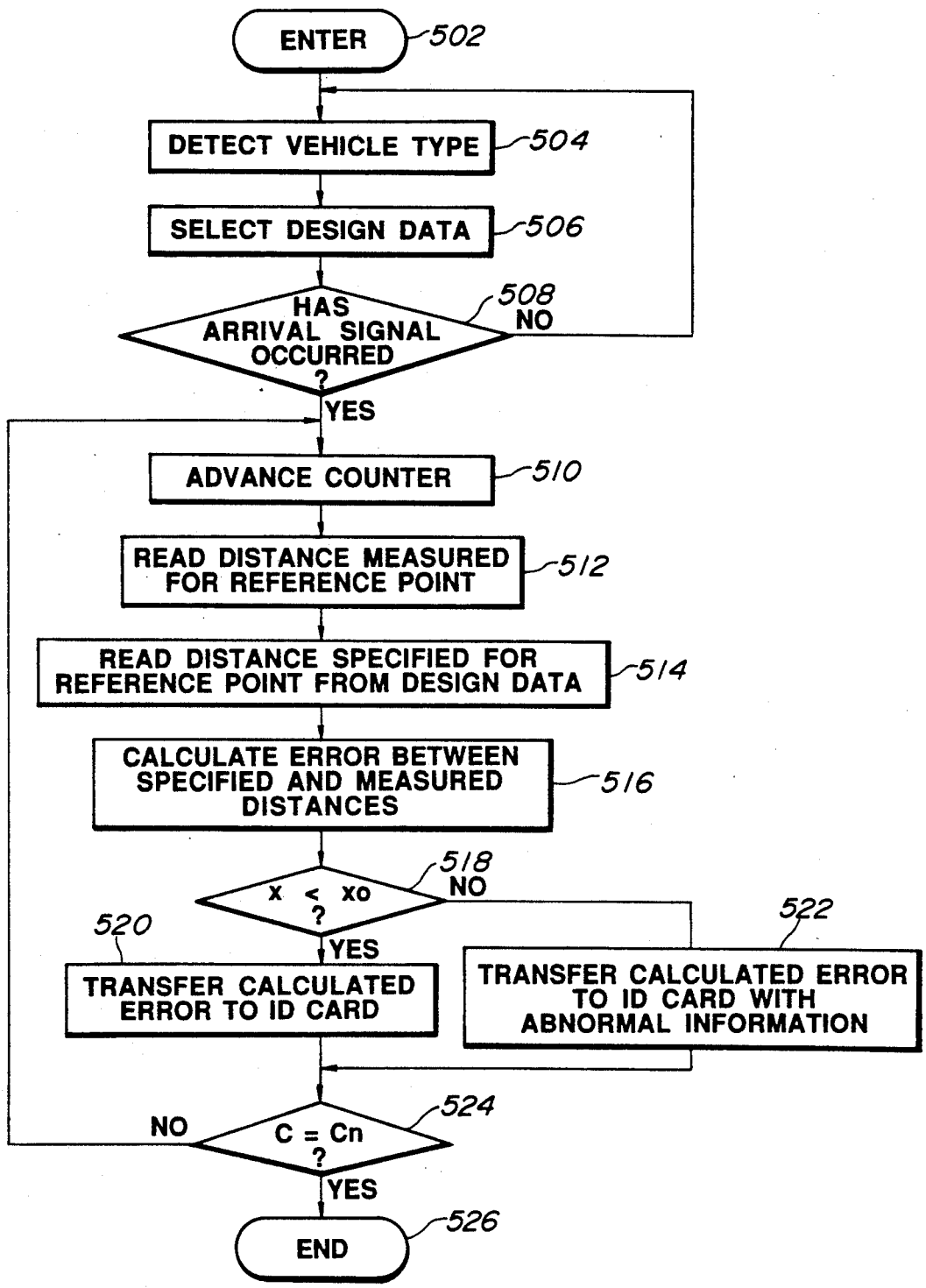
FIG. 3 is a flow diagram showing the programming of the digital computer used in the measuring section of FIG. 2.

FIG. 3 is a flow diagram illustrating the programming of the digital computer used in the control unit 130 of the distance measuring section 10 to form distance error data for each of the works. The computer program is entered at the point 502. At the point 504 in the program, the type of the vehicle to be assembled with the work W is detected. This vehicle type detection is made based on information fed thereto from a vehicle type sensor (not shown) adapted to recognize different work shapes. At the point 506 in the program, the central processing unit 132 selects vehicle body design data specified for the detected vehicle type. The selected vehicle body design data include distance values specified for the respective reference points positioned on the work W.

At the point 508 in the program, a determination is made as to whether or not the work W has been placed at a predetermined measurement position. This determination is made based on a signal fed thereto from a position sensor (not shown) provided for producing an arrival signal in response to the arrival of the work at the predetermined measured position. If the answer to this question is "yes", then the program proceeds to the point 510 where a counter is advanced by one step. Otherwise, the program returns to the point 504.

At the point 512 in the program, the central processing unit 132 reads a distance value measured for one of the reference points marked on the work W. At the point 514 in the program, the central processing unit 132 reads a distance value specified for the one reference point from the design data. At the point 516 in the program, the central processing unit 132 calculates an error x between the measured and specified distance values. When the measured distance value is greater than the specified distance value, the calculated error x has a positive sign indicating the fact that the work W is located inside of the designed vehicle body outline at the corresponding reference point. When the measured distance value is less than the specified distance value, the calculated error x has a negative sign indicating the fact that the work W is located outside of the designed vehicle body outline at the corresponding reference point. At the point 518 in the program, a determination is made as to whether or not calculated error x is less than a predetermined acceptable value (tolerance) xo. If the answer to this question is "yes", then it means that the work is normal and the program proceeds to the point 520 where the calculated error x is read into the identification (ID) card 50. Otherwise, the program proceeds to the point 522 where the calculated error x is read into the ID card 50 with abnormal information.

At the point 524 in the program, a determination is made as to whether or not the count C of the counter reaches a predetermined value Cn corresponding to the number of the reference points. If the answer to this question is "yes", then the program proceeds to the end point 526. Otherwise, the program returns to the point 510.

During the execution of this computer program, the ID card 50 stores distance errors for all of the reference points in a sequential fashion to form distance error data.

It is to be noted that the measured distance data, which include measured values of the distances of the respective reference points from the corresponding distance sensors, can be used to form data indicating the three-dimensional shape of the work. In this case, the vehicle body design data are not required to contain distance values specified in relation to the respective reference points and may contain distance values specified in relation to desired points on the work.

Figure 4:
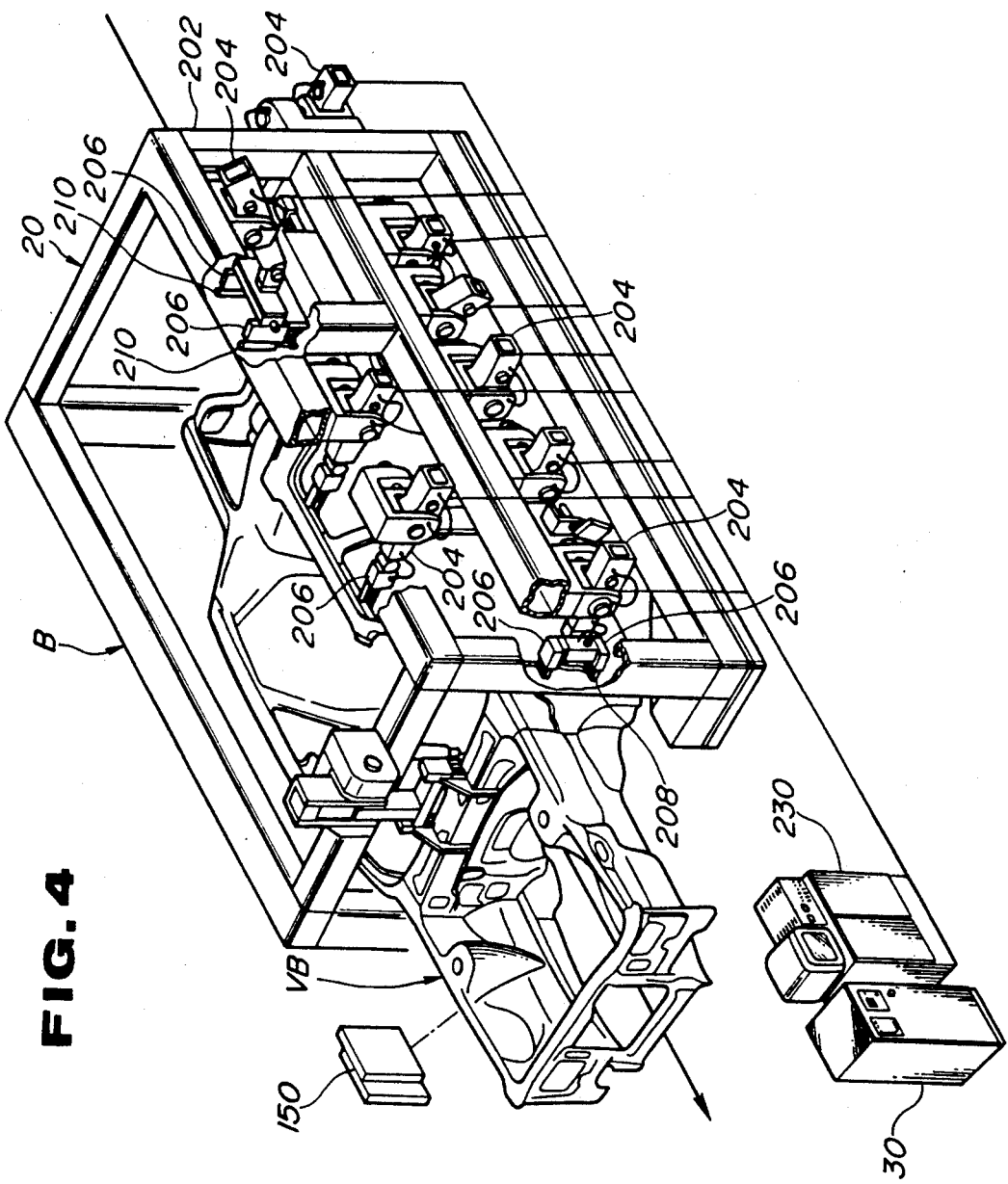
FIG. 4 is a perspective view showing a positioning section used in the work positioning apparatus of FIG. 1.

Referring to FIG. 4, the positioning section 20 is provided in a tack welding station B forming an automotive vehicle body assembling line. The tack welding station B is shown as having a vehicle body VB transferred thereinto from the preceding work station where the vehicle body VB has been temporarily assembled, such as by edge folding, from automobile body components including a floor main panel and left-and right-side panels. The positioning section 20 includes a support frame 202 having a number of industrial robots 204 mounted thereon. Each of the industrial robots 204 has one or more work positioning tools 206 each having a gauge 208 adapted to engage with the automobile body VB or one or more work clamping tools 210. Preferably, the gauge 208 is of the type having a stack of a number of metal strips arranged for movement in forward and rearward directions independently with respect to the other metal strips. The work positioning tool 206 also includes a servo motor for sliding the metal strips independently to respective appropriate positions at which the front ends of the metal strips are arranged in a shape conforming with the shape of the vehicle body VB and a locking device for locking the metal strips at the respective appropriate positions. These industrial robots 204 are controlled by a control unit 230.

Referring back to FIG. 1, the control unit 230 employs a digital computer including a central processing unit (CPU) 232, a memory (MEM) 234, motor control circuit (MCC) 236 and an interface (I/F) 238. The central processing unit 232 communicates with the rest of the computer via data bus 240. The memory 234 contains the program for operating the central processing unit 232 and further contains appropriate data used in calculating appropriate values for the positions of the respective work positioning tools. The memory 234 also has a memory section into which correction factor data are transferred through the interface 238 from the control section 30. The central processing unit 232 calculates desired values for the positions of the respective positioning tools utilizing the correction factor data. Control words specifying desired work positioning tool positions are periodically transferred by the central processing unit 232 to the motor control circuits 236. The motor control circuits 236 convert the received control words into command signals for application to the respective step motors. The step motors bring the corresponding work positioning tools to positions corresponding to the values calculated by the computer.

Referring back to FIG. 1, the control section 30 employs a digital computer which includes a central processing unit (CPU) 302, a memory (MEM) 304, an interface (I/F) 306, another interface (I/F) 308, and a data memory 310. The central processing unit 302 communicates with the rest of the computer via data bus 312. The memory 304 contains the program for operating the central processing unit 302. The data memory 310 stores computer aided design (CAD) data transferred thereinto through the interface 308 from a recording medium such as a cassette tape 40. The CAD data includes design data defining a position specified for each of the works. The design data are obtained when the vehicle body is designed. The design data for a selected one of the works are transferred through the interface 306 to the measuring section 10. The error data are transferred from the ID cards 150 through the interface 306 to the control section 30.

FIG. 5 is a flow diagram illustrating the programming of the digital computer used in the control section 30 to calculate correction factors. The computer program is entered at the point 602. At the point 604 in the program, the type of the vehicle body to be assembled with the works is detected. This vehicle body type detection is made based on information fed thereto from vehicle type sensors (not shown) adapted to recognize different work shapes. At the point 606 in the program, a determination is made as to whether or not the works have been placed at respective predetermined positions. This determination is made based on signals fed thereto from position sensors (not shown) each producing an arrival signal in response to the arrival of the corresponding work at the predetermined position. When all of the arrival signals have occurred, the answer to this question is "yes" and the program proceeds to the point 608 where a counter is advanced by one step. Otherwise, the program returns to the point 604.

At the point 610 in the program, the central processing unit 238 reads the distance errors xA and xB from the ID cards 150 associated with first and second works to be jointed to each other. In this case, the distance error xA is read from the ID card 150 associated with the floor main, and the distance error xB is read from the ID card 150 associated with the body side. At the point 612 in the program, a determination is made as to whether or not the sign of each of the read distance errors xA and xB is positive or negative. If the distance error xA is equal to or less than zero and the distance error xB is equal to or less than zero, then it means that both the distance measured between the first work and the distance sensor and the distance between the second work and the distance sensor are less than the respective values specified by the design data and the program proceeds to the point 614 where a correction factor $\Delta x$ is calculated as $\Delta x = xA + xB$ to push the works inwardly.

If the distance error xA is greater than zero and the distance error xB is greater than zero, then the program proceeds to the point 616 where the central processing unit 232 calculates a correction factor $\Delta x$ as $\Delta x = -(xA + xB)$ to retract the works outwardly.

If the distance error xA is equal to or less than zero and the distance xB is greater than zero, or if the distance error xA is greater than zero and the distance error xB is equal to or less than zero, then the program proceeds to the point 618 where the central processing unit 238 calculates a correction factor $\Delta x$ as $\Delta x = xA - xB$.

At the point 620 in the program, a determination is made as to whether or not the calculated correction factor $\Delta x$ is within an acceptable range defined by an upper and lower limit. If the answer to this question is "yes", then the program proceeds to the point 626. If it is greater than the acceptable range, then the program proceeds to the point 622 where the correction factor $\Delta x$ is set at the upper limit. Following this, the program proceeds to the point 626. If it is less than the acceptable range, then the program proceeds to the point 624 where the correction factor $\Delta x$ is set at the lower limit. Following this, the program proceeds to the point 626.

At the point 626 in the program, the calculated correction factor $\Delta x$ is transferred to the positioning section 20. At the point 628 in the program, a determination is made as to whether the count C of the counter reaches a predetermined value Cn corresponding to the number of the reference points. If the answer to this question is "yes", then the program proceeds to the end point 630. Otherwise, the program returns to the point 608. Similar operations are repeated for all of the works.

What is claimed is:

1. An apparatus for positioning a plurality of works for combining to assemble an article, the apparatus comprising:
   means for measuring values of positions of a plurality of reference points set on each of the works;
   means for storing the measured position values to provide measured position data defining a measured position of each of the works;
   means for providing design data defining a position specified for each of the works;
   means for comparing the measured position data with the design data to provide error data defining a difference between the measure and specified positions for each of the works;
   means for reading, from the error data provided for a first one of the works, a first difference between the measured and specified positions for the first work;
   means for reading, from the error data provided for a second one of the works, a second difference between the measured and specified positions for the second work, the second work being to be jointed to the first work;
   means for calculating a correction factor equal to a sum of the first and second differences when both of the first and second differences have the same sign and a correction factor equal to a difference between the first and second differences when the first and second differences have different signs; and
   means for positioning the first and second works based on the calculated correction factor.

2. The work positioning apparatus as claimed in claim 1, further including means for setting a predetermined range defined by lower and upper limits, means for setting the correction factor at the lower limit when the correction factor is less than the lower limit, means for setting the correction factor at the upper limit when the correction factor is greater than the upper limit.

3. The work positioning apparatus as claimed in claim 1, further including a first identification card provided for the first work for storing the error data provided for the first work, and a second identification card provided for the second work for storing the error data provided for the second work.

4. The work positioning apparatus as claimed in claim 1, wherein the measuring means includes distance sensors for measuring values of distances of the reference points from the respective distance sensors, wherein the storage means stores the measured distance values to provide measured distance data defining the measured distance values in relation to the respective reference points, wherein the design data define distance values specified for the respective reference points, and wherein the comparing means provides error data defining a difference between the measured and specified distance values for each of the reference points.

5. The work positioning apparatus as claimed in claim 4, wherein the comparing means includes means for storing a difference between the measured and specified distance values in relation to the corresponding reference point along with an abnormal indication when the difference is out of a predetermined range.

6. A method of positioning a plurality of works combined to assemble an article, the method comprising the steps of:
   measuring values of positions of a plurality of reference points set on each of the works;
   storing the measured position values to provide measured position data defining a measured position of each of the works;
   providing design data defining a position specified for each of the works;
   comparing the measured position data with the design data to provide error data defining a difference between the measure and specified positions for each of the works;
   reading, from the error data provided for a first one of the works, a first difference between the measured and specified positions for the first work;
   reading, from the error data provided for a second one of the works, a second difference between the measured and specified positions for the second work, the second work being to be jointed to the first work;

calculating a correction factor equal to a sum of the first and second differences when both of the first and second differences have the same sign and a correction factor equal to a difference between the first and second differences when the first and second differences have different signs; and positioning the first and second works based on the calculated correction factor.

7. The work positioning method as claimed in claim 6, further including the steps of:

setting a predetermined range defined by lower and upper limits;

setting the correction factor at the lower limit when the correction factor is less than the lower limit; and setting the correction factor at the upper limit when the correction factor is greater than the upper limit.

8. The work positioning method as claimed in claim 6, wherein the error data provided for the first work are stored in a first identification card provided for the first work, and the error data provided for the second work are stored in a second identification card provided for the second work.

9. The work positioning method as claimed in claim 6, wherein the measured position data define the measured position values in relation to the respective reference points, wherein the design data define position values specified for the respective reference points, and wherein the error data define differences between the measured and specified position values in relation to the respective points.

10. The work positioning method as claimed in claim 9, further including the steps of storing a difference between the measured and specified position values in relation to the corresponding reference point along with an abnormal indication when the difference is out of a predetermined range.

* * * * *